(12) United States Patent
Etori et al.

(10) Patent No.: US 7,664,589 B2
(45) Date of Patent: Feb. 16, 2010

(54) APPARATUS AND METHOD FOR FOLLOWING A PRECEDING VEHICLE

(75) Inventors: Nariaki Etori, Atsugi (JP); Takashi Sugano, Brussels (BE)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 545 days.

(21) Appl. No.: 11/437,190

(22) Filed: May 19, 2006

(65) Prior Publication Data

US 2006/0265115 A1 Nov. 23, 2006

(30) Foreign Application Priority Data

May 20, 2005 (JP) .............................. 2005-148080

(51) Int. Cl.
*B60T 7/12* (2006.01)
(52) U.S. Cl. .............................. 701/96; 701/23; 701/93; 701/98; 701/300; 180/170
(58) Field of Classification Search .................. 701/96, 701/300, 301, 302, 70, 304
See application file for complete search history.

(56) References Cited

U.S. PATENT DOCUMENTS

| | | | | |
|---|---|---|---|---|
| 5,572,449 A | * | 11/1996 | Tang et al. ................... | 700/304 |
| 5,959,572 A | * | 9/1999 | Higashimata et al. .......... | 342/70 |
| 6,249,738 B1 | | 6/2001 | Higashimata et al. | |
| 6,330,508 B1 | * | 12/2001 | Akabori et al. ............... | 701/96 |
| 6,351,702 B1 | * | 2/2002 | Tange et al. ................... | 701/96 |
| 6,366,845 B1 | * | 4/2002 | Kannonji ..................... | 701/96 |
| 6,430,494 B1 | * | 8/2002 | Inoue et al. ................... | 701/96 |
| 6,459,982 B1 | * | 10/2002 | Kobayashi et al. ............ | 701/93 |
| 6,622,078 B1 | * | 9/2003 | Kuragaki et al. ............... | 701/96 |
| 6,859,716 B2 | * | 2/2005 | Kikuchi ....................... | 701/96 |
| 6,868,323 B2 | * | 3/2005 | Kichima et al. ............... | 701/70 |
| 6,876,915 B2 | * | 4/2005 | Kuramochi et al. ........... | 701/96 |
| 7,206,673 B2 | * | 4/2007 | Yamamura et al. ............ | 701/1 |
| 7,337,056 B2 | * | 2/2008 | Arai ............................ | 701/96 |
| 2002/0111733 A1 | * | 8/2002 | Akabori et al. ............... | 701/96 |
| 2002/0121398 A1 | * | 9/2002 | Kikuchi et al. .............. | 180/169 |
| 2002/0133285 A1 | * | 9/2002 | Hirasago ...................... | 701/96 |
| 2003/0033073 A1 | * | 2/2003 | Kichima et al. ............... | 701/96 |
| 2005/0010352 A1 | * | 1/2005 | Michi et al. .................. | 701/96 |
| 2005/0203693 A1 | * | 9/2005 | Arai et al. ..................... | 701/96 |
| 2005/0216169 A1 | * | 9/2005 | Arai ............................ | 701/96 |
| 2006/0212207 A1 | * | 9/2006 | Sugano et al. ................ | 701/93 |

FOREIGN PATENT DOCUMENTS

| | | |
|---|---|---|
| DE | 103 20 722 A1 | 11/2004 |
| EP | 1 065 087 A2 | 1/2001 |
| EP | 1 065 090 A2 | 1/2001 |
| EP | 1 070 624 A1 | 1/2001 |
| EP | 1 233 391 A2 | 8/2002 |
| JP | 11334552 A | 7/1999 |

* cited by examiner

*Primary Examiner*—Khoi Tran
*Assistant Examiner*—Jonathan Sample
(74) *Attorney, Agent, or Firm*—Young Basile

(57) ABSTRACT

An apparatus and method for controlling a vehicle to follow a preceding vehicle. A stop-holding device maintains a stopped state automatically when the vehicle is stopped, and the stop-holding device is in an enabled state or a disabled state. A control state for following the preceding vehicle is changed, at least in part, according to a set state of the stop-holding device.

19 Claims, 9 Drawing Sheets

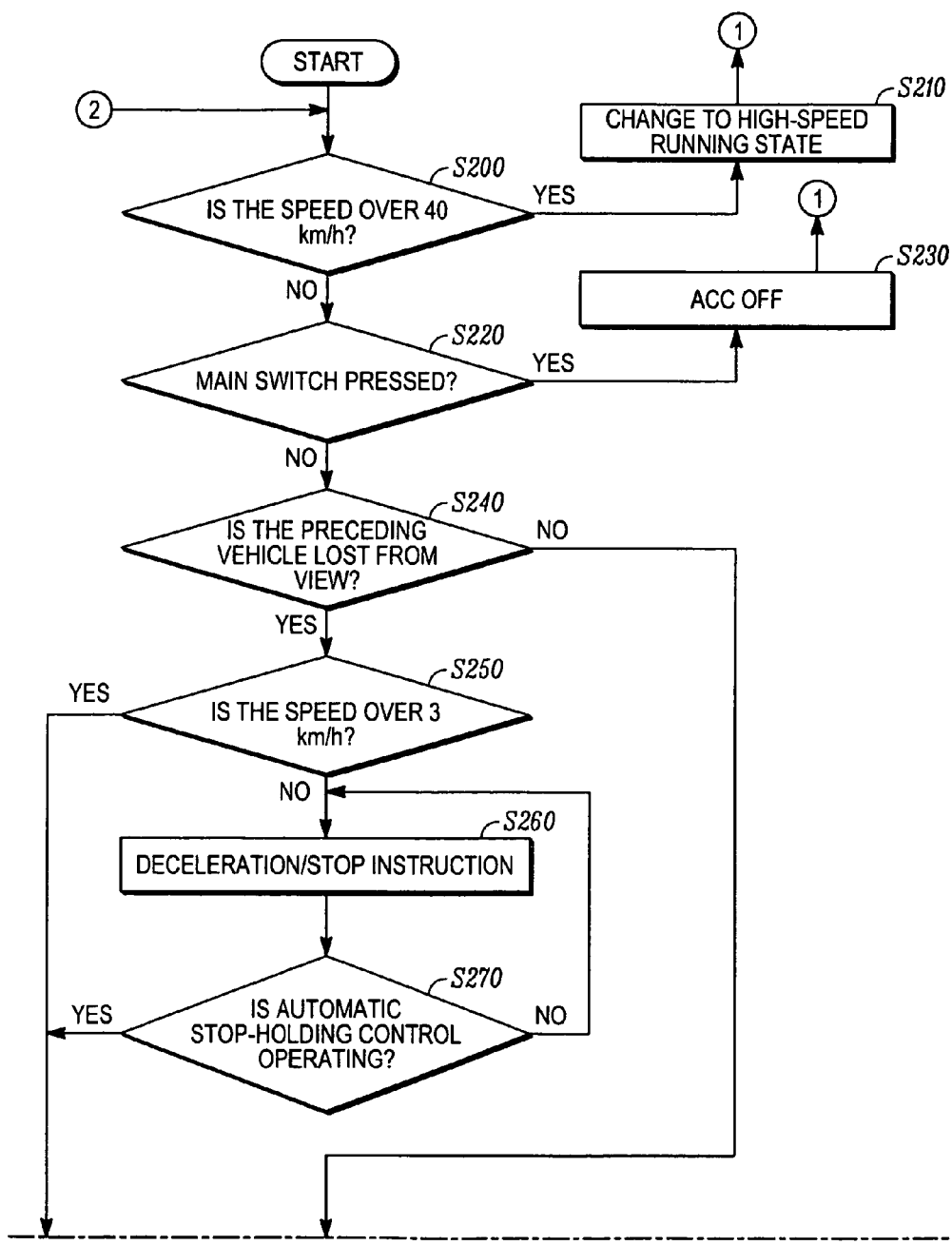

APPARATUS AND METHOD FOR FOLLOWING A PRECEDING VEHICLE

TECHNICAL FIELD

The present invention pertains to an apparatus and method for a vehicle that enables running of the vehicle while following a preceding vehicle.

BACKGROUND

A controller for following a preceding vehicle and for automatic following of the preceding vehicle is known from, for example, Japanese Kokai Patent Application No. 1999-334552. In that controller, when the vehicle speed falls below a prescribed speed, the control for following the preceding vehicle is released, and only control of the brake force is continued. When the vehicle speed nearly reaches 0, the brake force control is released. Consequently, when the preceding vehicle stops and then moves forward again, it is necessary to brake to keep the automobile stopped, to perform an acceleration operation to move the automobile forward and to perform a switch operation to restart the control for following the preceding vehicle.

BRIEF SUMMARY OF THE INVENTION

Embodiments disclosed herein include an apparatus for a vehicle for following a preceding vehicle. The apparatus comprises, for example, an inter vehicle distance sensor that detects the inter vehicle distance between the vehicle and the preceding vehicle, a brake device that decelerates the vehicle, a stop-holding device that maintains a stopped state automatically when the vehicle is stopped, an operation member for setting the stop-holding device in one of an enabled state and a disabled state, and a controller. The controller is operable to perform control for following the preceding vehicle using the brake device based on a signal from the inter vehicle distance sensor and operable to use the operation member to change a control state for following the preceding vehicle according to a set state of the stop-holding device.

The apparatus can also comprise an inter vehicle distance sensor that detects an inter vehicle distance between the vehicle and the preceding vehicle, a brake device that decelerates the vehicle, a stop-holding device that maintains a stopped state automatically when the vehicle is stopped, an operation member for setting the stop-holding device in one of an enabled state and a disabled state, and a controller operable to perform control for following the preceding vehicle using the brake device based on a signal from the inter vehicle distance sensor and operable to perform a following control while following the preceding vehicle until the vehicle is stopped when the stop-holding device is in the enabled state.

Also disclosed herein is a control system for a vehicle for following a preceding vehicle that performs control for following the preceding vehicle based on the inter vehicle distance from the preceding vehicle. The control system can comprise a judgment device that determines whether a stop-holding device is operable to automatically maintain a stopped state is in one of an enabled state and a disabled state once the vehicle is stopped and a control state switching device operable to maintain the control for following the preceding vehicle until the vehicle is stopped if the judgment device indicates that the stop-holding device is in the enabled state and to release the control for following the preceding vehicle once a vehicle speed falls below a prescribed vehicle speed if the judgment device indicates that the stop-holding device is in the disabled state.

Methods for control of a vehicle for following a preceding vehicle are also disclosed. One method comprises setting a stop-holding device that can automatically maintain a stopped state in one of an enabled state and a disabled state once the vehicle is stopped, determining whether the stop-holding device is in the enabled state or the disabled state and changing a control state of the control for following the preceding vehicle in response to whether the stop-holding device is in the enabled state or the disabled state.

According to embodiments of the invention, it is possible to perform control for following the preceding vehicle appropriately corresponding to the state of the stop-holding device.

BRIEF DESCRIPTION OF THE DRAWINGS

The description herein makes reference to the accompanying drawings wherein like reference numerals refer to like parts throughout the several views, and wherein:

FIGS. 7A and 7B include a flow chart illustrating the content of controller process when the control for following the preceding vehicle is in the second low-speed following state;

DETAILED DESCRIPTION OF EMBODIMENTS OF THE INVENTION

Figure 1:
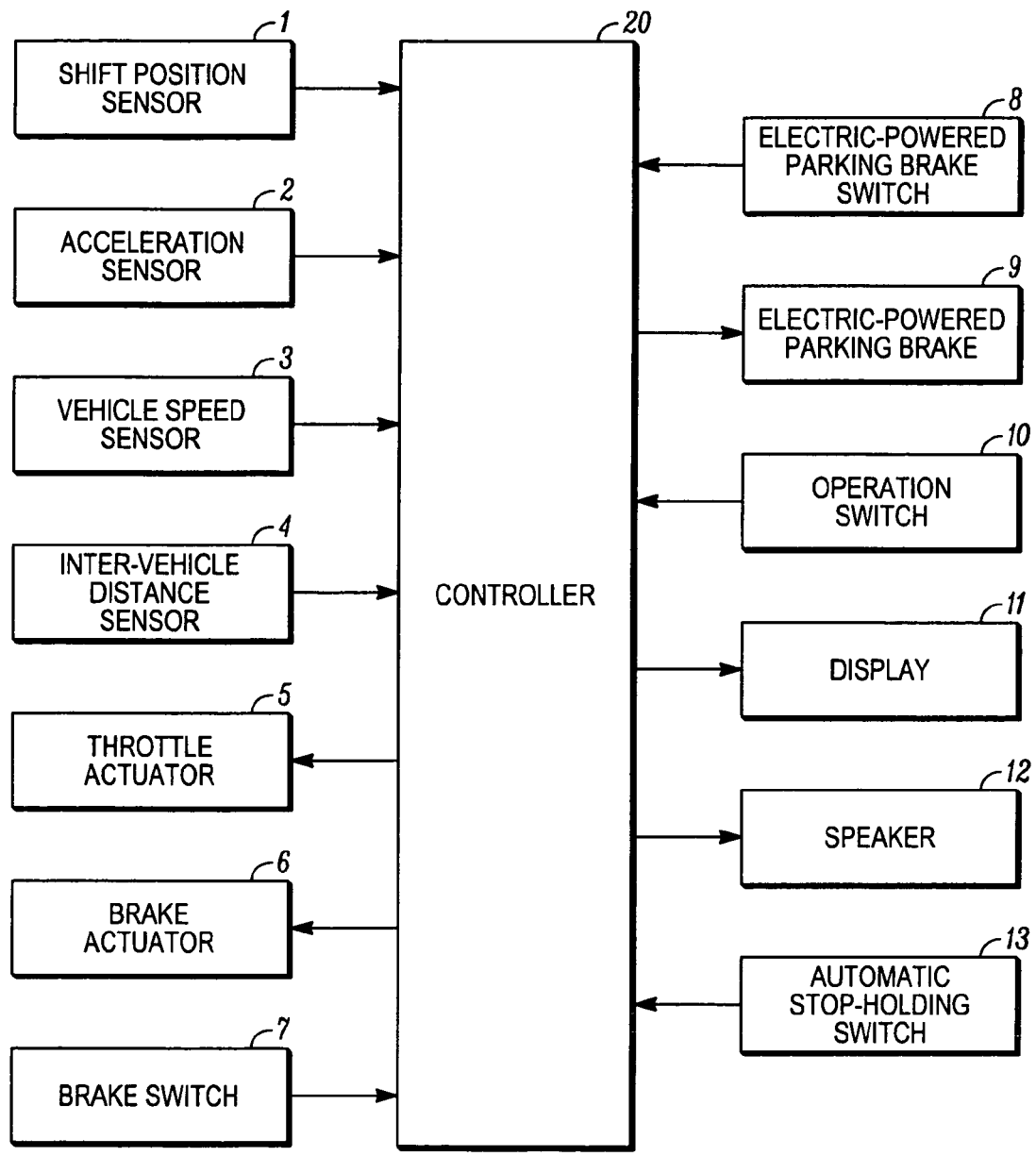
FIG. 1 is a diagram illustrating one example of an apparatus for following a preceding vehicle.

FIG. 1 is a diagram illustrating one example of an apparatus for following a preceding vehicle. The apparatus has a number of parts, including shift position sensor 1, acceleration sensor 2, vehicle speed sensor 3, inter-vehicle distance sensor 4, throttle actuator 5, brake actuator 6, brake switch 7, electric-powered parking brake switch 8 (hereinafter to be referred to as EPKB switch 8), electric-powered brake 9 (hereinafter to be referred to as EPKB 9), operation switch 10, display 11, speaker 12, automatic stop-holding switch 13 and controller 20. EPKB 9 performs stop-holding functions, and EPKB switch 8 performs operation functions. Vehicle speed sensor 3 performs the function of vehicle speed detecting. Either display 11 or speaker 12 or both perform notification functions, while display 11 additionally performs display functions. Each of these elements is discussed in more detail hereinafter.

Shift position sensor 1 detects the current shift position. Acceleration sensor 2 detects the fact of stepping on the acceleration pedal. Vehicle speed sensor 3 detects the vehicle speed. Inter-vehicle distance sensor 4 has a radar device. By sending a laser beam ahead of the vehicle, the preceding vehicle is detected, and, at the same time, the inter-vehicle distance to the preceding vehicle is detected.

Controller 20 performs control functions as discussed in more detail herein. Based on the instruction from controller 20, throttle actuator 5 controls opening of a throttle valve (not shown) to control acceleration/deceleration of vehicle. Based on the instruction from controller 20, brake actuator 6 controls the brake force of the hydraulic brake (not shown) set in each vehicle.

Based on the inter-vehicle distance detected by inter-vehicle distance sensor 4 and the speed of the automobile detected by vehicle speed sensor 3, controller 20 performs control for following the preceding vehicle so that the automobile follows the preceding vehicle automatically. That is, when the preceding vehicle is detected, throttle actuator 5 and brake actuator 6 are controlled so that the inter-vehicle distance is kept constant between the automobile and the preceding vehicle. Brake switch 7 detects that the brake pedal (not shown) is stepped on.

EPKB switch 8 is a switch for working/release of EPKB 9 to be explained later. When the vehicle stops, and the driver turns ON EPKB switch 8, EPKB 9 set on the left/right rear wheels is turned ON. In the operation of EPKB 9, a brake wire is wound up by a motor (not shown) so that a frictional member is pressed on the brake disk (not shown) to lock the wheels. At an average speed, although the driver does not step on the brake pedal, the vehicle can still maintain the stopped state.

Automatic stop-holding switch 13 is a switch for turning ON/OFF the automatic stop-holding system. Next, the automatic stop-holding system is explained. When the automatic stop-holding system is ON, and the driver steps on the brake pedal to stop the vehicle, controller 20 turns ON EPKB 9. EPKB 9 operates independently of turning ON of EPKB switch 8 by the driver. As a result, even if the driver does not step on the brake pedal, the stopped state of the vehicle still can be maintained. In addition, when the driver steps on the acceleration pedal (acceleration operation), the working of EPKB 9 is released, and normal operation is possible. In this way, a system that performs stop-holding control with EPKB 9 when the vehicle stops is called an automatic stop-holding system.

Also, a change of the automatic stop-holding system from the ON to the OFF state is not limited to the case when automatic stop-holding switch 13 is turned ON. A change from ON to OFF also takes place if an abnormality occurs in the automatic stop-holding system.

According to embodiments of the invention, the state of control for following the preceding vehicle is changed corresponding to the ON/OFF state of automatic stop-holding switch 13.

Figure 2:
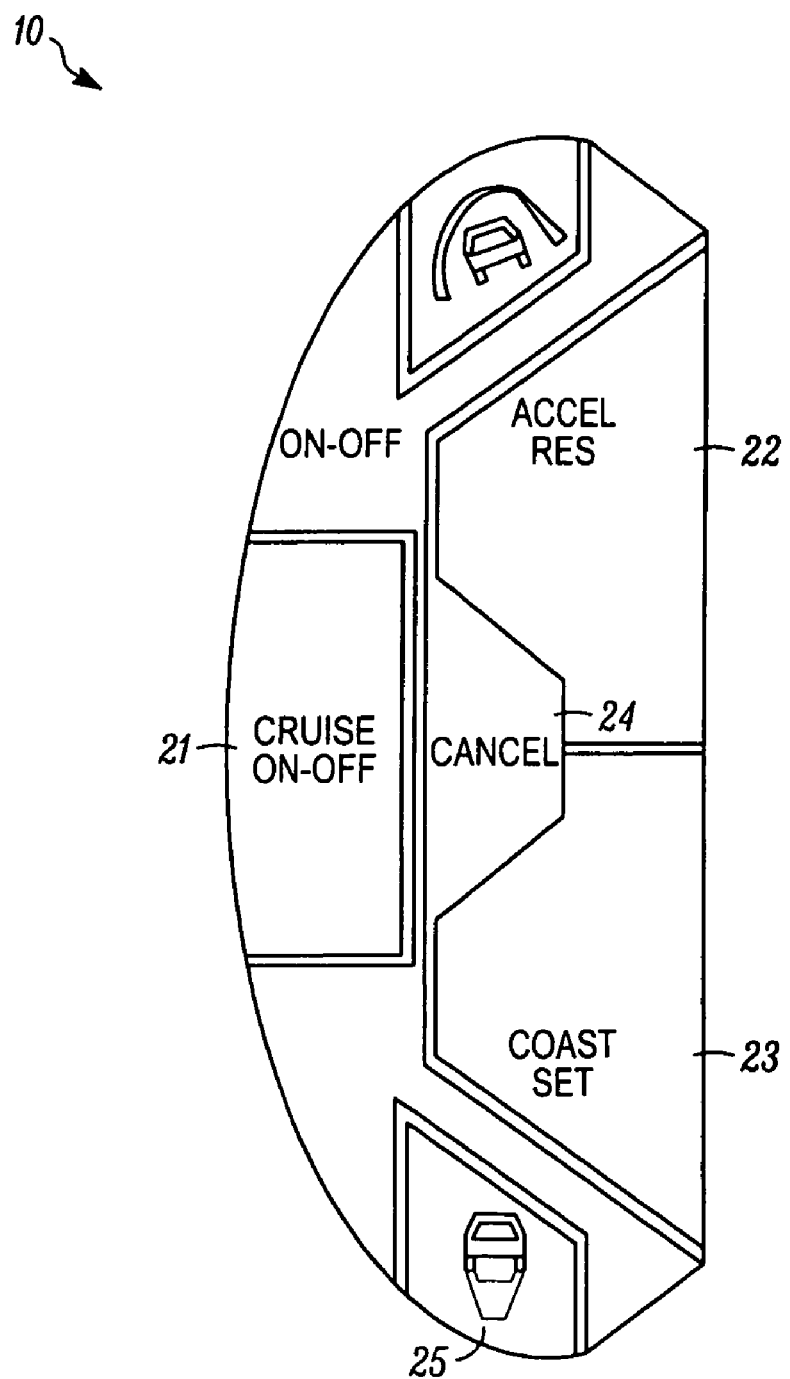
FIG. 2 is a diagram illustrating in detail one example of the operation switch.

Operation switch 10 is a switch for performing various control operations for following the preceding vehicle. FIG. 2 is a diagram illustrating in detail an example of an operation switch 10. Operation switch 10 is set at a position on the steering wheel that allows easy operation. Main switch 21 is a switch for turning ON/OFF the control system for following the preceding vehicle. Resume/acceleration switch 22 is a switch for increasing the speed when control for following the preceding vehicle is performed. Set/coast switch 23 is a switch for lowering the speed when control for following the preceding vehicle is performed. When set/coast switch 23 or main switch 21 is pressed, and the control system for following the preceding vehicle is ON, the control for following the preceding vehicle is actually started with the switch.

Cancel switch 24 is a switch for releasing the control for following the preceding vehicle when control for following the preceding vehicle is carried out. Inter-vehicle setting switch 25 is a switch for changing the inter-vehicle distance (the target inter-vehicle distance) to the preceding vehicle.

Display 11 is set at a position that can be easily viewed by the driver, and it displays the control state and the operating state of EPKB 9 (i.e., whether or not it is in an enabled state). When the control state of the apparatus is changed, speaker 12 chimes to indicate a change in the control state.

Figure 3:
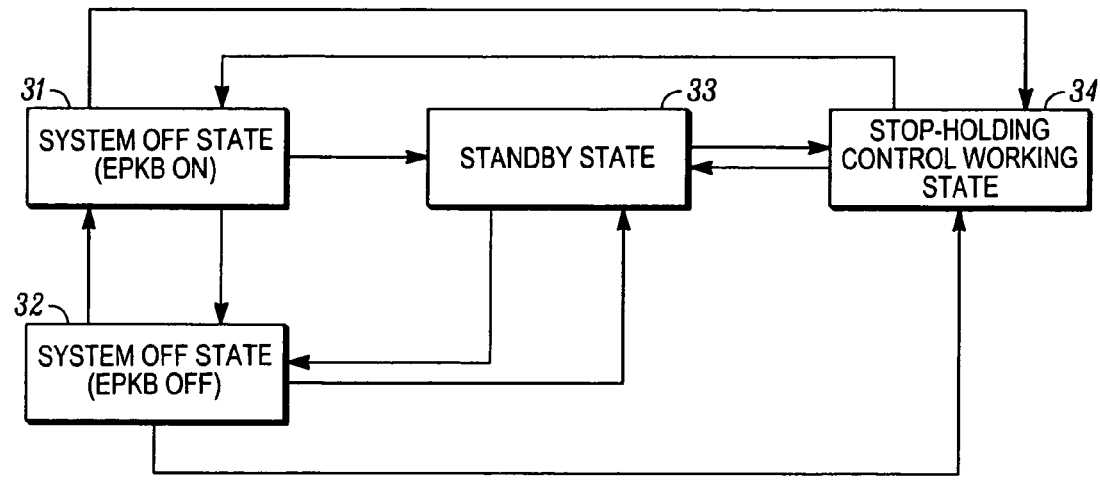
FIG. 3 is a diagram illustrating transition between the various control states of the automatic stop-holding control.

FIG. 3 is a diagram illustrating transition of the various control states of the stop-holding control in the automatic stop-holding system. States 31 and 32 are the OFF state of the automatic stop-holding system. Of them, state 31 refers to the state in which EPKB 9 is turned ON by means of ON of EPKB switch 8, and state 32 is the state in which EPKB 9 does not operate. In state 31 or state 32 when the automatic stop-holding system is OFF, and automatic stop-holding switch 13 is turned ON, the automatic stop-holding system comes ON. In this case, if the vehicle speed is higher than 0 km/h, state 33 is entered. State 33 is a state in which the automatic stop-holding system is ON, and system start control of the vehicle is performed, that is, the standby operational state of the automatic stop-holding system.

On the other hand, in state 31 or state 32 when automatic stop-holding switch 13 is pressed, if the vehicle speed is 0 km/h, that is, the vehicle is stopped, state 34 is entered. In state 34, stop-holding control of the vehicle is performed by EPKB 9 (ON state of the stop-holding control). Also, in state 33 when the vehicle speed is 0 km/h, that is, the vehicle is stopped, state 34 is entered.

In state 34 when stop-holding control is performed, and the driver steps on the acceleration pedal, ON of EPKB 9 is released. State 33 is entered, that is, the standby state of the stop-holding control. Also, in state 34 when automatic stop-holding switch 13 is used to perform the release operation of the automatic stop-holding system, state 31 is entered. That is, in the state when vehicle stop-holding control is performed with EPKB 9, and the automatic stop-holding system is released while stop-holding control is continued with EPKB 9, the automatic stop-holding system is turned OFF.

Figure 4:
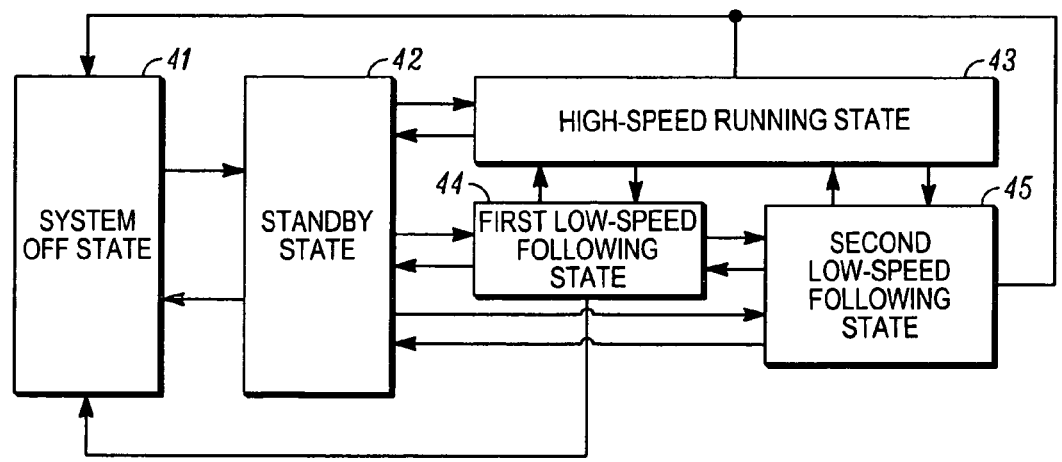
FIG. 4 is a diagram illustrating transition of the various control states of the control for following the preceding vehicle.

FIG. 4 is a diagram illustrating transition of the various control states for following the preceding vehicle. In state 41 the control system for following the preceding vehicle is turned OFF. In this state, when main switch 21 contained on operation switch 10 is pressed, the control system for following the preceding vehicle is turned ON, and state 42 is entered. In state 42 the control system for following the preceding vehicle is turned ON, and the system is in the standby state without start of the control for following the preceding vehicle. However, in standby state 42, when main switch 21 is pressed the control system for following the preceding vehicle is turned OFF. State 41 is entered.

The states performing control for following the preceding vehicle are states 43-45. In state 43 control for following the preceding vehicle is performed for vehicle speeds in the range of 40-100 km/h. In states 44 and 45 the vehicle speed is lower than 40 km/h, and control for following the preceding vehicle is performed. Here, state 43 is called the high-speed region operating state, or the high-speed running state.

In state 44 the automatic stop-holding system is OFF, and control for following the preceding vehicle is performed when the vehicle speed is in the range of 5-40 km/h. Here, state 44 is called the first low-speed following state. In state

45, the automatic stop-holding system is ON, and control for following the preceding vehicle is performed when the vehicle speed is in the range of 0-40 km/h. Here, state 45 is called the second low-speed following state. That is, in one embodiment by means of ON/OFF of the automatic stop-holding system, the control content of the control for following the preceding vehicle is changed.

In standby state 42, the vehicle speed is in the range of 40-100 km/h, and the driver does not step on the brake pedal. Also, when the driver presses set/coast switch 23, high-speed running state 43 is entered. In high-speed running state 43, when a preceding vehicle is detected ahead of the automobile, the vehicle speed preset by the driver is taken as an upper limit, and at the preset inter-vehicle distance control for following is performed. When no preceding vehicle is detected, control is performed so that the driver has the vehicle run at the preset vehicle speed (the set vehicle speed).

In high speed running state 43, when one of the following listed conditions (a)-(d) is established, state 42, the standby state in the control for following the preceding vehicle, is entered:

(a) while a preceding vehicle is not detected, the vehicle speed falls to 40 km/h or lower;

(b) the driver brakes;

(c) the driver turns ON cancel switch 24; or (d) the shift position of the automatic transmission (not shown) is moved to a position other than drive (D).

In standby state 42, when all of the following listed conditions (e)-(i) are met, first low speed following state 44 is entered:

(e) the driver has not stepped on the brake pedal;

(f) a preceding vehicle is detected;

(g) set/coast switch 23 is pressed;

(h) the vehicle speed is in the range of 5-40 km/h; and (i) the automatic stop-holding system is OFF.

In first low speed following state 44, when one of conditions (b)-(d) and the following conditions (j) and (k) are met, state 42 is entered:

(j) the vehicle speed falls below 5 km/h; and (k) the preceding vehicle is lost from view (i.e., the preceding vehicle cannot be detected).

Also, in first low speed following state 44, when the vehicle speed rises above 40 km/h, and the set vehicle speed for constant speed running in high speed running state 43 is set by the driver, high speed running state 43 is entered. However, in high speed running state 43, when the vehicle speed falls below 40 km/h while a preceding vehicle is detected, and the automatic stop-holding system goes OFF, first low speed following state 44 is entered.

In standby state 42 of the control for following the preceding vehicle, if all of conditions (e)-(g) as well as the following listed conditions (l) and (m) are met, second low speed following state 45 is entered:

(l) the vehicle speed is in the range of 0-40 km/h; and (m) the automatic stop-holding system is in the ON state or standby state.

In second low speed following state 45, if any one of conditions (b)-(d) or (k) as well as the following condition (n) is met, state 42 is entered: (n) the vehicle speed is in the range of 0-5 km/h, and the automatic stop-holding system goes OFF.

In second low speed following state 45, if the vehicle speed is 5 km/h or higher, the automatic stop-holding system goes OFF at the time first low speed following state 44 is entered. However, in first low speed following state 44, when the automatic stop-holding system enters the automatic standby state, second low speed following state 45 is entered.

In second low-speed following state 45, if the vehicle speed reaches 40 km/h or higher, and a set vehicle speed for constant speed running in high-speed running state 43 is set by the driver, high-speed running state 43 is entered. However, in high-speed running state 43 if the vehicle speed falls below 40 km/h, and the automatic stop-holding system enters the standby state while a preceding vehicle is detected, second low-speed following state 45 is entered.

In states 43, 44, 45, if main switch 21 is pressed the control system for following the preceding vehicle goes OFF. State 41 is entered.

Figure 5A:
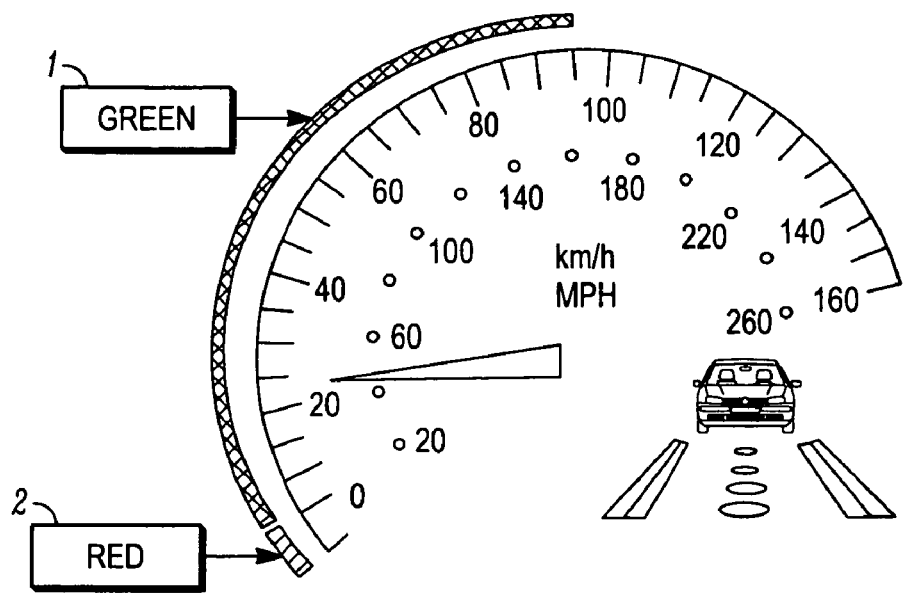
FIG. 5A illustrates the display state of the display in the first low-speed following state.
Figure 5B:
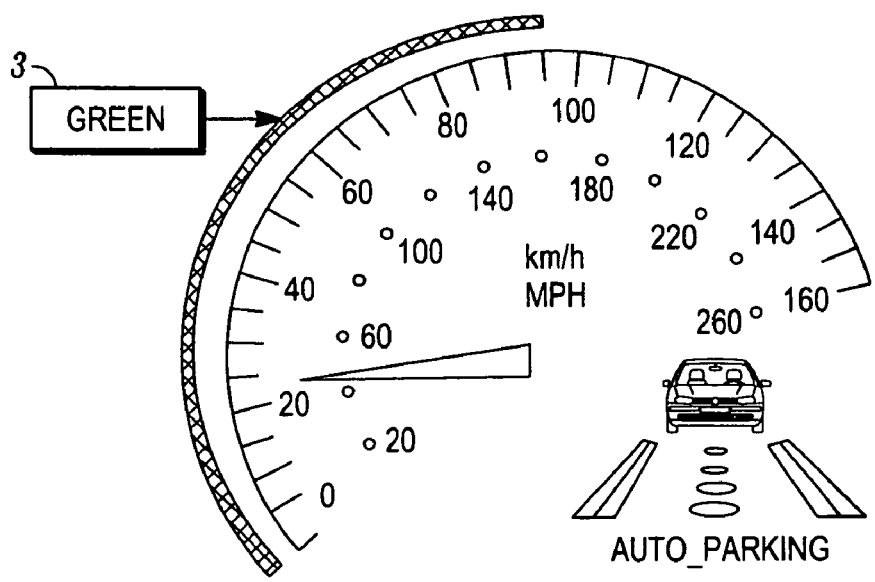
FIG. 5B illustrates the display state of the display in the second low speed following state.

As described above, by means of ON/OFF of the automatic stop-holding system the control for the following the preceding vehicle is changed. Consequently, when the state of the control for following the preceding vehicle goes from first low-speed following state 44 to second low-speed following state 45, the display state of display 11 is changed. FIG. 5A shows the display state of display 11 in first low-speed following state 44. FIG. 5B shows the display state of display 11 in second low-speed following state 45. On display 11, together with the vehicle speedometer, the vehicle speed range where control for following the preceding vehicle is performed as well as the ON/OFF state of the automatic stop-holding system are displayed.

In first low-speed following state 44, the fact that the vehicle speed range where control for following the preceding vehicle is performed is 5 km/h or higher is displayed on display 11. At the same time, the automatic stop-holding system is OFF. In first low-speed following state 44, the vehicle speed range where control for following the preceding vehicle is performed is in the range of 5-40 km/h. If the vehicle speed is over 40 km/h high-speed running state 43 is entered, and control for following the preceding vehicle is continued. Consequently, as shown in FIG. 5A the vehicle speed range where control for following the preceding vehicle is performed is displayed as a range of 5-100 km/h.

In second low-speed following state 45, the fact that the vehicle speed range where control for following the preceding vehicle is performed is over 0 km/h is displayed on display 11. At the same time, the automatic stop-holding system is shown to be ON. The fact that the automatic stop-holding system is ON is displayed by the text "Auto Parking." Just as in the display state of first low-speed following state 44, the upper limit of the vehicle speed range where control for following the preceding vehicle is performed is displayed as 100 km/h instead of 40 km/h (see FIG. 5B).

Figure 6:
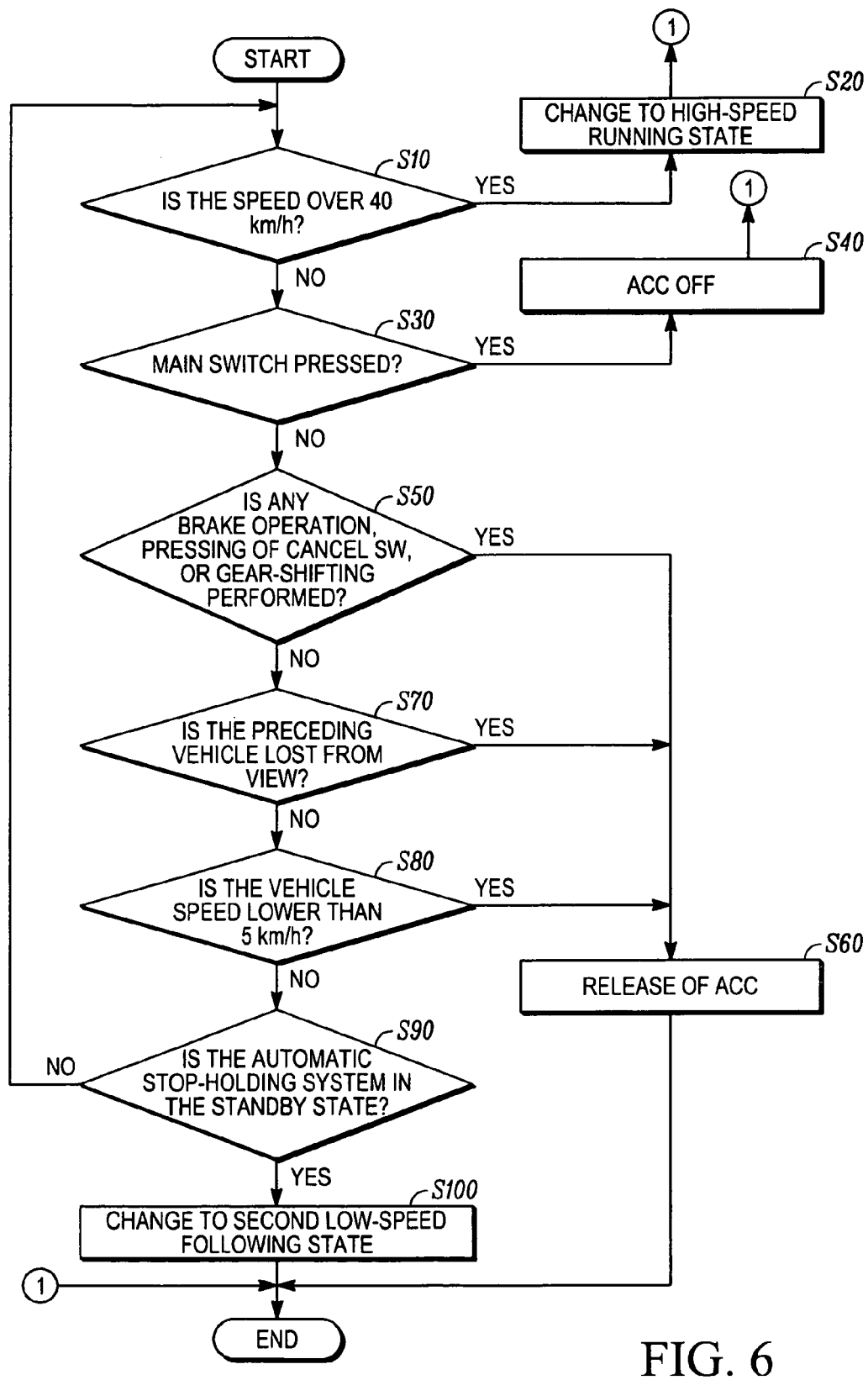
FIG. 6 is a flow chart illustrating the controller process when the control for following the preceding vehicle is in the first low-speed following state.

FIG. 6 is a flow chart illustrating the content of processing performed by controller 20 when the vehicle is in first low-speed following state 44. When the control for following the preceding vehicle goes to first low-speed following state 44, controller 20 starts the processing at step S10. In step S10 a judgment is made as to whether the vehicle speed detected by vehicle speed sensor 3 is 40 km/h or higher. If the vehicle speed is over 40 km/h, the process goes to step S20, and control for following the preceding vehicle is performed in high-speed running state 43.

On the other hand, in step S10 if the vehicle speed is below 40 km/h the process goes to step S30. In step S30 judgment is made as to whether main switch 21 is pressed. If main switch 21 is pressed, the process goes to step S40. In step S40 the control system for following the preceding vehicle is turned OFF. As a result, the control for following the preceding vehicle goes from first low-speed following state 44 to state 41.

On the other hand, in step S30 if it is judged that main switch 21 is not pressed, the process goes to step S50. In step S50 judgment is made as to whether any one condition among conditions (b)-(d) is met, that is, whether the driver is executing any one of brake operation, operation of cancel switch 24 or shifting of the gear to a position other than drive (D). Based on signals input from brake switch 7, operation switch 10 and shift position sensor 1, it is judged that one of the operations is performed by the driver, that is, brake operation, pressing of cancel switch 24 or shifting the gear to a position other than drive (D). As a result, the process goes to step S60. However, if the judgment result is that none of these operations is being performed, the process goes to step S70.

In step S70 judgment is made as to whether the preceding vehicle is lost from view based on the signal input from inter-vehicle distance sensor 4. If the preceding vehicle has been lost from view, the process goes to step S60. If not, the process goes to step S80. In step S80 judgment is made as to whether the vehicle speed detected by vehicle speed sensor 3 is lower than 5 km/h. If the vehicle speed is lower than 5 km/h, the process goes to step S60. If the vehicle speed is not lower than 5 km/h at step S80, the process goes to step S90.

In step S60 the control for following the preceding vehicle is released. As a result, the control for following the preceding vehicle changes from first low-speed following state 44 to standby state 42.

In step S90 judgment is made as to whether the automatic stop-holding system is in the standby state. In first low-speed following state 44, the automatic stop-holding system is OFF. If the driver presses automatic stop-holding switch 13, and the automatic stop-holding system is in the standby state, the process goes to step S100. In step S100 control for following the preceding vehicle is performed in second low-speed following state 45. That is, the control for following the preceding vehicle changes from first low-speed following state 44 to second low-speed following state 45.

Figure 7B:
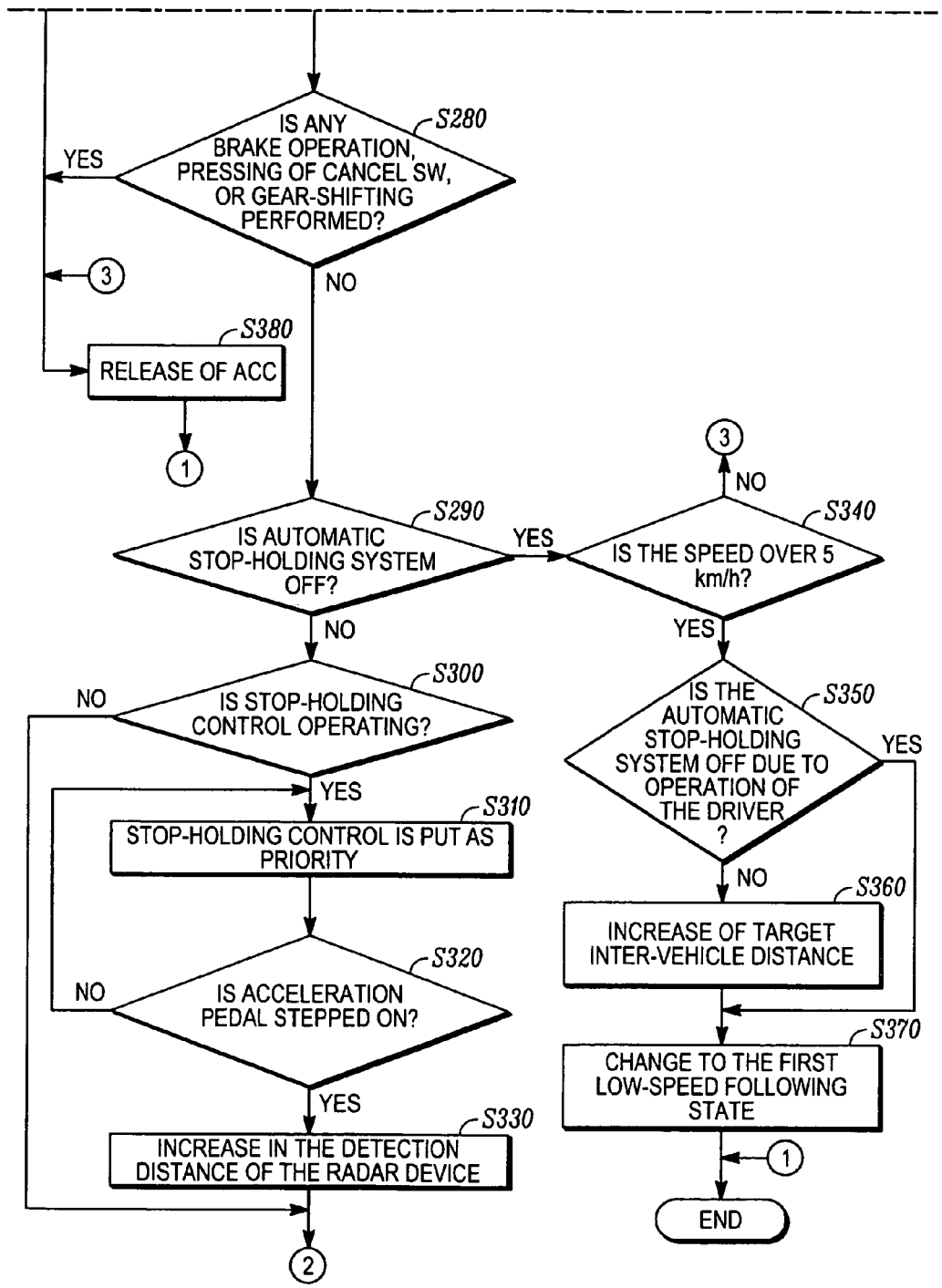

FIGS. 7A and 7B include a flow chart illustrating the content of processing by means of controller 20 when the control for following the preceding vehicle is in second low speed following state 45. When the control for following the preceding vehicle changes to second low speed following state 45, controller 20 starts the processing from step S200. In step S200, judgment is made as to whether the vehicle speed detected by vehicle speed sensor 3 is over 40 km/h. If the vehicle speed is over 40 km/h, the process goes to step S210, and control for following the preceding vehicle is performed in high speed running state 43.

On the other hand, in step S200 if the vehicle speed is lower than 40 km/h, the process goes to step S220. In step S220 judgment is made as to whether main switch 21 is pressed. If main switch 21 is pressed, the process goes to step S230. In step S230, the control system for following the preceding vehicle is turned OFF. As a result, the control for following the preceding vehicle changes from second low-speed following state 45 to state 41.

On the other hand, in step S220 when main switch 21 is not pressed, the process goes to step S240. In step S240, based on the signal input from inter vehicle distance sensor 4, judgment is made as to whether the preceding vehicle is lost from view. If the preceding vehicle is lost from view, the process goes to step S250. In step S250, judgment is made as to whether the vehicle speed detected by vehicle speed sensor 3 is over a prescribed vehicle speed. Here, assume that the prescribed vehicle speed is 3 km/h. Then, in step S250, if the vehicle speed is over 3 km/h, the process goes to step S380. However, if the vehicle speed is lower than 3 km/h, the process goes to step S260.

In step S260 an operation instruction is sent to a hydraulic brake with respect to brake actuator 6 to change the vehicle speed to 0 km/h. As explained above, in second low speed following state 45, if the preceding vehicle is lost from view, the control for following the preceding vehicle is released, and the standby state is entered. However, if the vehicle speed is lower than 3 km/h, in order to stop the vehicle, the hydraulic brake is turned ON (when the hydraulic brake is turned ON, working of the hydraulic brake continues). Also, when the vehicle stops, an instruction to release the hydraulic brake is output to brake actuator 6. At the same time EPKB 9 is turned ON.

In step S270 after step S260, judgment is made as to whether the automatic stop-holding control is turned ON, that is, whether the stop-holding control of the vehicle with EPKB 9 is ON. If EPKB 9 performs stop-holding control of the vehicle, the process goes to step S380. If EPKB 9 is not working, the process returns to step S260. The hydraulic brake continues to work.

That is, in second low-speed following state 45 when the automobile follows the preceding vehicle and decelerates, a change occurs from the hydraulic brake used for deceleration of the vehicle to EPKB 9, and the vehicle is maintained in a stopped state. Even after stopping the vehicle, to keep the hydraulic brake working it is necessary to keep current flowing in brake actuator 6. When the vehicle stops, and a change is made to EPKB 9, it is possible to prevent the continuation of current flow in brake actuator 6.

In step S240 if the preceding vehicle is not lost from view, the process goes to step S280. In step S280 judgment is made as to whether any one of conditions (b)-(d) is met, that is, whether any one of these operations are performed by the driver: brake operation, pressing of cancel switch 24 or shifting the gear to a position other than drive (D). If the operation is one of the operations performed by the driver, that is, brake operation, pressing of cancel switch 24 or shifting the gear to a position other than drive (D), based on the signals input from brake switch 7, operation switch 10 and shift position sensor 1, the process goes to step S380. On the other hand, if none of these operations is performed, the process goes to step S290.

In step S290 it is judged whether the automatic stop-holding system is OFF. As explained above, when the automatic stop-holding system is ON, if the driver presses automatic stop-holding switch 13 or if any abnormality occurs in the automatic stop-holding system, the automatic stop-holding system is turned OFF. If the automatic stop-holding system is turned OFF the process goes to step S340. On the other hand, if the system is kept ON the process goes to step S300.

In step S300 judgment is made as to whether the stop-holding control of the vehicle is performed with EPKB 9. As explained above, when the vehicle following the preceding vehicle decelerates and stops, switching is made from the hydraulic brake to EPKB 9, and the vehicle is maintained in a stopped state. If the stop-holding control is performed with EPKB 9, the process goes to step S310. Stop-holding control is not performed. On the other hand, if the vehicle is running the process returns to step S200.

In step S310 the stopped state of the vehicle is maintained in that the stop-holding control of the vehicle with EPKB 9 is taken prior to the control for following the preceding vehicle. In the controller for following the preceding vehicle, the automatic stop-holding system is turned ON. As the vehicle is decelerated and stopped while control for following the preceding vehicle is performed, the stop-holding control of the vehicle is performed with EPKB 9. Even during the period when the stop-holding control is performed the operating state is kept as is without releasing the control for following the preceding vehicle. However, when the automobile is in the stopped state, as long as the intention of going ahead by the driver is unclear the stop-holding control is continued. Consequently, even when a stopped preceding vehicle starts moving forward starting of the vehicle with the control for following the preceding vehicle is still not performed. The stop-holding control of the vehicle takes priority.

In step S320, after step S310, based on the signal input from acceleration sensor 2 a judgment is made as to whether the driver has stepped on the acceleration pedal. If the driver has not stepped on the acceleration pedal, the process returns to step S310. On the other hand, if the driver has stepped on the acceleration pedal so the driver clearly has an intention to drive ahead, the process goes to step S330. Also, in the present embodiment, even when the preceding vehicle is started and driven ahead, the vehicle itself is still not started and driven ahead. However, one may also adopt a scheme in which the vehicle is automatically started and driven ahead corresponding to starting and driving-ahead of the preceding vehicle.

Figure 8:
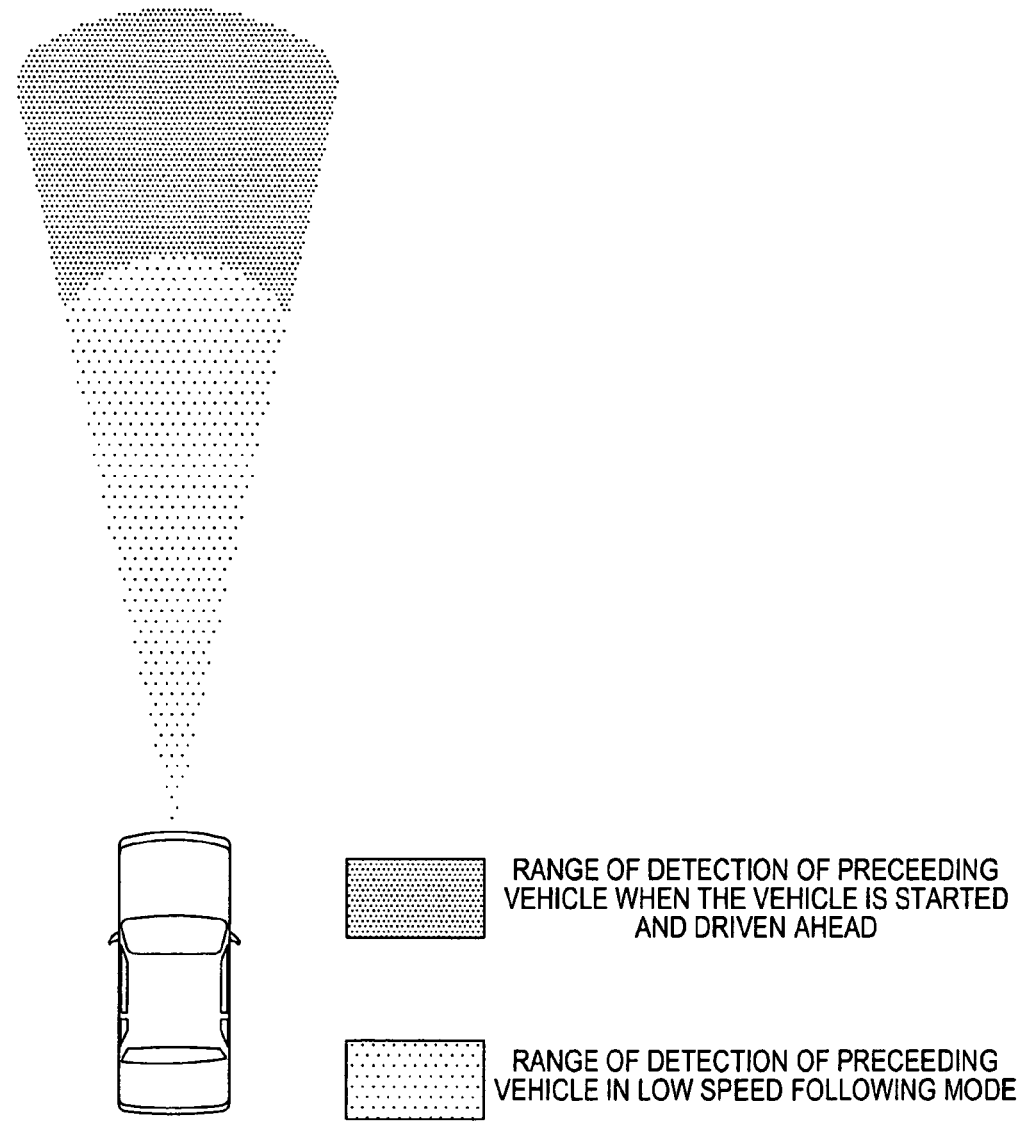
FIG. 8 is a diagram illustrating an example of the detection range when the detection distance of the radar device is increased.

In step S330 the operation of EPKB 9 is released. By means of the control for following the preceding vehicle, the automobile is started and driven ahead. At the same time the detection distance of the radar device contained in inter vehicle distance sensor 4 is increased. FIG. 8 is a diagram illustrating an example of the detection range when the detection distance of the radar device is increased. The closely-spaced dotted portion indicates the enlarged detection range. By increasing the detection distance, the preceding vehicle can be started and driven ahead. Even when the inter vehicle distance from a stopped automobile increases, the preceding vehicle can be detected by the radar device at high reliability. That is, it is possible to prevent loss of view of the preceding vehicle and to prevent release of the control for following the preceding vehicle. After increasing the detection distance of the radar device contained in inter-vehicle distance sensor 4, the process returns to step S200.

After judgment is made in step S290 that the automatic stop-holding system is OFF, the process goes to step S340. In this step, judgment is made as to whether the vehicle speed detected by vehicle speed sensor 3 is 5 km/h or higher. If the vehicle speed is 5 km/h or higher, the process goes to step S350. On the other hand, if the speed is lower than 5 km/h the process goes to step S380. In step S380 the control for following the preceding vehicle is released. As a result, the control for following the preceding vehicle is changed from second low-speed following state 45 to standby state 42.

In step S350 judgment is made as to whether the automatic stop-holding system is OFF due to pressing of automatic stop-holding switch 13 by the driver. When the driver presses automatic stop-holding switch 13 it is judged that the automatic stop-holding system is turned OFF. The process proceeds to step S370. When an abnormality takes place in the automatic stop-holding system it is judged that the automatic stop-holding system is turned OFF. The process proceeds to step S360.

In step S360 the target inter-vehicle distance in the control for following the preceding vehicle is greater than the preset inter-vehicle distance. When control for following the preceding vehicle is performed while the vehicle speed is over 5 km/h, the automatic stop-holding system is turned OFF, and the control state changes from second low-speed following state 45 to first low-speed following state 44. In first low-speed following state 44, for example, if the vehicle speed falls below 5 km/h, control different from second low-speed following state 45 is performed so that the control for following the preceding vehicle is released. The standby state or the like is entered. Consequently, when an abnormality occurs in the automatic stop-holding system, the automatic stop-holding system is automatically turned OFF, and the state of the control for following the preceding vehicle is changed to first low-speed following state 44. In this case, extra time is given for the driver to recognize that the state of the control for following the preceding vehicle has changed. For this purpose, the target inter-vehicle distance in the control for following the preceding vehicle is increased. Control for increasing the target inter-vehicle distance may be performed only for a prescribed period of time. In step S370, after step S360, processing in first low-speed following state 44 is performed.

Next, an explanation is provided with reference to FIG. 5. In first low-speed following state 44 as compared to second low-speed following state 45, the display state of display 11 is changed. As a result, the driver can comprehend the control state of the control for following the preceding vehicle. In a scenario of vehicle running to be explained later, in first low-speed following state 44 and second low-speed following state 45, when speaker 12 generates a different chime, the driver can easily comprehend the control state of the control for following the preceding vehicle. The following are three running scenarios for the vehicle with a change in the chime:

(T1) when the preceding vehicle is lost from view by the radar device contained in inter-vehicle distance sensor 4;

(T2) when the vehicle approaches the preceding vehicle and the inter-vehicle distance with respect to the preceding vehicle decreases; or (T3) when automatic switching is performed from high-speed running state 43 to a low-speed following state 44, 45.

When control for following the preceding vehicle is performed, if the automatic stop-holding system enters the enabled state the vehicle stops, and stop-holding control of the vehicle is started. Even after starting the stop-holding control, the control for following the preceding vehicle is still not released. Consequently, in the state in which the control for following the preceding vehicle is carried out, it is possible to reduce the operational load on the driver when the vehicle is started from the stopped state. In the known controller for following the preceding vehicle discussed previously, when control for following the preceding vehicle is carried out the control for following the preceding vehicle is released before the vehicle is stopped. Consequently, it is necessary for the driver to perform the following operations: stepping on the brake pedal to stop the vehicle, stepping on the acceleration pedal to start the vehicle driving ahead and pressing of the switch to re-start the control for following the preceding vehicle. On the other hand, by using the apparatus or method for following the preceding vehicle according to embodiments of the present invention, it is possible for a vehicle to follow the preceding vehicle appropriately and to perform stopping and driving appropriately.

Also, when the vehicle is stopped while control for following the preceding vehicle is performed, a change occurs from the hydraulic brake with brake actuator 6 to EPKB 9, and the stopped state of the vehicle is maintained. As a result, during the period when the stopped state of the vehicle is maintained it is possible to prevent the continuation of current flow in brake actuator 6.

According to an embodiment, when control for following the preceding vehicle is performed, and the automatic stop-holding system is disabled, the speed of the vehicle falling below a prescribed vehicle speed (5 km/h in an embodiment) results in release of the control for following the preceding vehicle. As a result, in order to stop the vehicle with the automatic stop-holding system in the disabled state, the driver is made aware of the need to step on the brake pedal. Consequently, by means of the control for following the preceding vehicle, the vehicle is stopped, and the driver knows that the automatic stop-holding system is turned ON after stopping. It is thus possible to prevent the driver from forgetting to step on the brake pedal. Also, in the first low speed following control state the vehicle speed in releasing the control for following the preceding vehicle is not limited to 5 km/h. Release is also possible after reaching nearly 0 km/h.

For the controller for following the preceding vehicle according to an embodiment, the automatic stop-holding system is enabled. When the speed of the vehicle falls below a prescribed vehicle speed (3 km/h by example), if the preceding vehicle is lost from view, the control for following the preceding vehicle is released. By means of the hydraulic brake, the vehicle is decelerated and stopped. Also, after the vehicle is stopped, stop-holding control is performed with EPKB 9. As a result, even if the preceding vehicle is lost from view, it is still possible to stop the vehicle automatically and to perform stop-holding control. Consequently, it is possible to reduce the operational load on the driver.

According to an embodiment, in second low-speed following state 45, when the automatic stop-holding system is turned OFF due to generation of an abnormality in the automatic stop-holding system, first low-speed following state 44 is entered. At the same time, the target inter-vehicle distance is increased during control for following the preceding vehicle. As a result, extra time is given to the driver to recognize the change in the state of the control for following the preceding vehicle.

The present invention is not limited to these various embodiments. For example, in these embodiments the vehicle is stopped when control for following the preceding vehicle is performed. Switching is made from the hydraulic brake to EPKB 9, and the stopped state of the vehicle is maintained. However, one may also adopt another system to maintain the stopped state of the vehicle. Usually, the hydraulic brake is composed of a master cylinder (not shown) that presses out brake fluid as the driver steps on the brake pedal, and a wheel cylinder (not shown) that applies braking with the hydraulic pressure from the master cylinder. However, one may also adopt a scheme in which an electromagnetic valve is set between the master cylinder and the wheel cylinder. Then, when the vehicle is stopped the electromagnetic valve is turned OFF to block the brake fluid so that the automatic stop-holding system that keeps the vehicle stopped is used.

Figure 9:
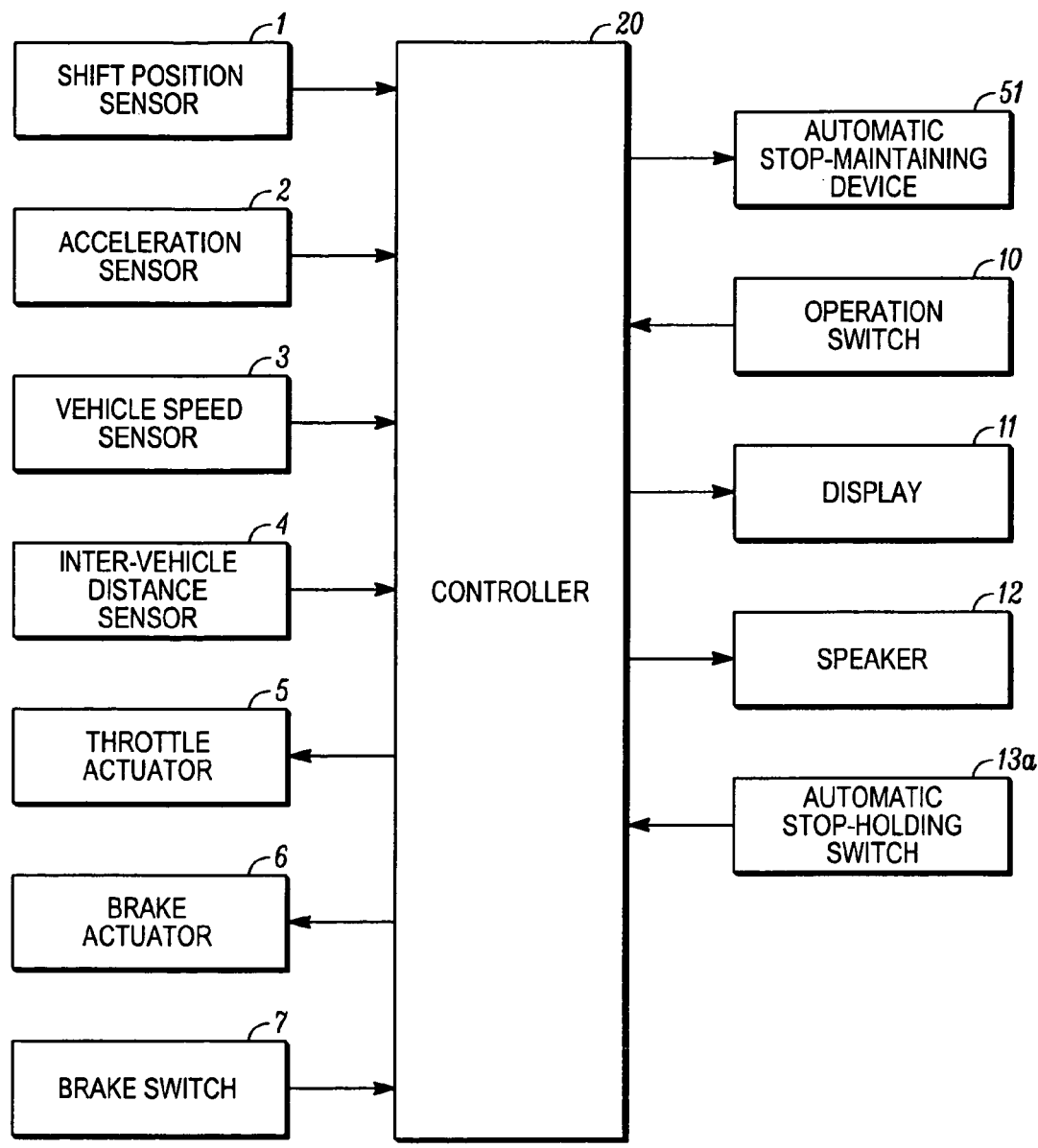
FIG. 9 is a diagram illustrating another example of an apparatus for following the preceding vehicle that includes an automatic stop-holding device.

FIG. 9 is a diagram illustrating another example of a vehicle having an automatic stop-holding system. Different from that shown in FIG. 1, instead of EPKB switch 8 and EPKB 9, there is automatic stop-maintaining, or stop-holding, device 51 using the electromagnetic valve. Also, instead of automatic stop-holding switch 13, there is automatic stop-holding switch 13*a*. Automatic stop-holding device 51 is a device for keeping the vehicle stopped. Automatic stop-holding switch 13*a* is a switch for switching automatic stop-holding device 51 between the enabled state and disabled state. Just as in the case of stop-holding control with EPKB 9, automatic stop-holding device 51 is enabled. Also, when control for following the preceding vehicle is performed and the vehicle is stopped, automatic stop-holding device 51 is turned ON. The vehicle is maintained in a stopped condition.

For this example using automatic stop-holding device 51, too, instead of EPKB 9, automatic stop-holding device 51 is used to keep the vehicle stopped. The same treatment as that in the previously described embodiments can be performed. For example, when control for following the preceding vehicle is performed, when automatic stop-holding device 51 enters the enabled state, the vehicle is stopped. By means of automatic stop-holding device 51, the stop-holding control of the vehicle is started, and the control for following the preceding vehicle is not released even after starting the stop-holding control. As a result, in the state when control for following the preceding vehicle is performed, it is possible to reduce the operational load on the driver when the vehicle is started and driven ahead from the stopped state.

For the control for following the preceding vehicle one may also adopt a device other than EPKB 9 or automatic stop-holding device 51. The control for following the preceding vehicle with the hydraulic brake in the ON state of the automatic stop-holding control requires an excessive durability specification for brake actuator 6 to keep current flowing for a long time in brake actuator 6. Consequently, it is preferred that a system other than a brake actuator be used to perform stop-holding control. Also, one may adopt a scheme in which both EPKB 9 and automatic stop-holding device 51 are used, and EPKB 9 and automatic stop-holding device 51 are used selectively according to the specific state.

Alternative schemes are possible. For example, when the following state is changed, the state of change is displayed by means of a voice guide with speaker 12 or with notification to the driver by display on display 11. Especially because first low speed following state 44 and second low speed following state 45 are different from each other with respect to the range of vehicle speed for performing control for following the preceding vehicle, when there is a change in the state between state 44 and state 45, it is preferred that the driver be notified of the change in the state. In this embodiment, the control for following the preceding vehicle is switched between high-speed running state 43 and low-speed following states 44, 45. However, one may also adopt a scheme in which control for following the preceding vehicle is performed with control allowed from a low-speed range to a high-speed range without having to switch according to the vehicle speed.

This application is based on Japanese Patent Application No. 2005-148080, filed May 20, 2005, in the Japanese Patent Office, the entire contents of which are hereby incorporated by reference.

Also, the above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for a vehicle for following a preceding vehicle, the apparatus comprising:

an inter-vehicle distance sensor that detects an inter-vehicle distance between the vehicle and the preceding vehicle;

a brake device that decelerates the vehicle;

a stop-holding device, different from the brake device, that maintains a stopped state of the vehicle when the vehicle is stopped and the stop-holding device is in a working state;

a controller including an automatic stop-holding system that controls operating states of the stop-holding device when the automatic stop-holding system is in an enabled state; and an operation member for setting the automatic stop-holding system in one of the enabled state and a disabled state; and wherein the controller is configured to perform control for following the preceding vehicle using the brake device based on a signal from the inter-vehicle distance sensor; to release the brake device when the vehicle is stopped and the stop-holding device is in the working state; and to change at least one operating condition of the control for following the preceding vehicle after exiting the stopped state according to whether the automatic stop-holding system is in the enabled state or in the disabled state when the vehicle is stopped.

2. The apparatus according to claim 1, further comprising: a vehicle speed sensor that detects a vehicle speed; and wherein the controller is configured to perform a first following control that releases the control for following the preceding vehicle when the vehicle speed is lower than a first prescribed vehicle speed and the automatic stop-holding system is in the disabled state.

3. The apparatus according to claim 2 wherein the controller is configured to perform a second following control while the control for following the preceding vehicle is engaged and the automatic stop-holding system is in the enabled state.

4. The apparatus according to claim 3 wherein the controller is configured to stop the vehicle while the control for following the preceding vehicle is released when the preceding vehicle is lost from view by the inter-vehicle distance sensor and the vehicle speed falls below a second prescribed vehicle speed in the second following control.

5. The apparatus according to claim 3 wherein the controller is configured to release the control for following the preceding vehicle when the automatic stop-holding system is changed from the enabled state to the disabled state and the vehicle speed falls below the first prescribed vehicle speed during the second following control.

6. The apparatus according to claim 3 wherein the controller is configured to switch from the second following control to the first following control responsive to the automatic stop-holding system changing from the enabled state to the disabled state and to the vehicle speed rising above the first prescribed vehicle speed during the second following control.

7. The apparatus according to claim 6 wherein the controller is configured to set a target inter-vehicle distance in the first following control that is longer than a preset value when the automatic stop-holding system changes from the enabled state to the disabled state due to generation of an abnormality in the stop-holding device.

8. The apparatus according to claim 3, further comprising: a notifying device that generates a notification chime at a prescribed running scenario during the control for following the preceding vehicle, the notifying device configured to generate different chimes in the first following control and the second following control.

9. The apparatus according to claim 3 wherein the controller is further configured to make the working state of the stop-holding device a priority over the control for following the preceding vehicle by holding the vehicle against advancement from the stopped state during the second following control even if the preceding vehicle is advancing if the stop-holding device is enabled.

10. The apparatus according to claim 3 wherein the controller is configured to increase a range of the inter-vehicle distance sensor to advance the vehicle in the second following control operation subsequent to the stopped state and when the automatic stop-holding system is in the enabled state.

11. The apparatus according to claim 3, further comprising:
a display device that displays at least one of an operating state of the stop-holding device, a status of the first following control and a status of the second following control.

12. The apparatus according to claim 1 wherein the controller is configured to execute a high-speed following control when the vehicle is at a speed in a high-speed range and a low-speed following control when the vehicle is at a speed in a low-speed range; and wherein the controller is configured to change a control state of the low-speed following control corresponding to a state of the automatic stop-holding system as set by the operation member.

13. A control system for a vehicle for following a preceding vehicle that performs control for following the preceding vehicle based on an inter-vehicle distance from the preceding vehicle, the control system comprising:
stop-holding means, diffrent from a brake device, for maintaining a stopped state of the vehicle once the vehicle is stopped by the brake device when the stop-holding means is in a working state;
operating state control means having an enabled state for controlling operating states of the stop-holding means and having a disable state;
judgment means for determining whether the operating state control means is in one of the enabled state and a disabled state; and
control state switching means for maintaining the control for following the preceding vehicle until the vehicle is stopped if the judgment means indicates that the operating state control means is in the enabled state and for releasing the control for following the preceding vehicle once a vehicle speed falls below a prescribed vehicle speed if the judgment means indicates that the operating state control means is in the disabled state.

14. A method for control of a vehicle for following a preceding vehicle, the method comprising:
setting an automatic stop-holding system in one of an enabled state and a disabled state, the automatic stop-holding system able to maintain a stopped state of the vehicle using a stop-holding device when in the enabled state once the vehicle is stopped by the brake device, the stop-holding device being different from the brake device;
releasing the brake device when the vehicle is stopped and the automatic stop-holding system is in the enabled state;
determining whether the automatic stop-holding system is in the enabled state or the disabled state; and
changing a control state of the control for following the preceding vehicle in response to whether the automatic stop-holding system is in the enabled state or the disabled state.

15. The method according to claim 14, further comprising:
executing a high-speed following control when the vehicle is at a speed in a high-speed range; and
executing a low-speed following control when the vehicle is at a speed in a low-speed range; and wherein changing the control state further includes changing a control state of the low-speed following control corresponding to whether the automatic stop-holding system is in the enabled state or in the disabled state.

16. The method according to claim 14, further comprising:
detecting a vehicle speed of the vehicle; and
performing a first following control that releases the control for following the preceding vehicle when the vehicle speed is lower than a first prescribed vehicle speed and the automatic stop-holding system is in the disabled state.

17. The method according to claim 16, further comprising:
performing a second following control while the control for following the preceding vehicle is engaged and the automatic stop-holding system is in the enabled state.

18. The method according to claim 17, further comprising:
stopping the vehicle while the control for following the preceding vehicle is released when the preceding vehicle is lost from view and the vehicle speed falls below a second prescribed vehicle speed in the second following control.

19. The method according to claim 16, further comprising:
releasing the control for following the preceding vehicle when the automatic stop-holding system is changed from the enabled state to the disabled state and the vehicle speed falls below the first prescribed vehicle speed during the second following control.

\* \* \* \* \*